United States Patent
Fujii et al.

(10) Patent No.: US 10,027,260 B2
(45) Date of Patent: Jul. 17, 2018

(54) METHOD OF CONTROLLING ROTARY ELECTRIC MACHINE

(71) Applicant: Mitsubishi Electric Corporation, Tokyo (JP)

(72) Inventors: Hirofumi Fujii, Tokyo (JP); Daiki Matsuura, Tokyo (JP); Noriyuki Wada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/449,034

(22) Filed: Mar. 3, 2017

(65) Prior Publication Data

US 2017/0366113 A1    Dec. 21, 2017

(30) Foreign Application Priority Data

Jun. 15, 2016  (JP) .................................. 2016-118629

(51) Int. Cl.
*H02P 21/00* (2016.01)
*H02P 6/06* (2006.01)
*H02P 21/22* (2016.01)

(52) U.S. Cl.
CPC ................ *H02P 6/06* (2013.01); *H02P 21/22* (2016.02)

(58) Field of Classification Search
CPC ...... H02P 1/00; H02P 3/00; H02P 4/00; H02P 6/00; H02P 21/00; H02P 27/04; H02P 27/06; H02P 41/00
USPC .... 318/400.01, 400.02, 400.14, 400.15, 700, 318/701, 779, 801, 599, 490, 504, 807, 318/811, 432; 388/800, 819; 363/21.1, 363/40, 44, 95, 120, 174
See application file for complete search history.

(56) References Cited

U.S. PATENT DOCUMENTS

| | | | | |
|---|---|---|---|---|
| 7,489,099 | B2* | 2/2009 | Fujiwara | .................. H02P 21/14 318/432 |
| 2011/0241583 | A1* | 10/2011 | He | .................. H02P 21/0021 318/400.09 |
| 2011/0241584 | A1* | 10/2011 | He | .................. H02P 6/08 318/400.09 |

FOREIGN PATENT DOCUMENTS

| | | |
|---|---|---|
| JP | 2004-080896 A | 3/2004 |
| JP | 2012-095528 A | 5/2012 |
| JP | 2015-201979 A | 11/2015 |

OTHER PUBLICATIONS

Communication dated Jun. 6, 2017, from the Japanese Patent Office in counterpart application No. 2016-118629.

* cited by examiner

*Primary Examiner* — Antony M Paul

(74) *Attorney, Agent, or Firm* — Sughrue Mion, PLLC; Richard C. Turner

(57) ABSTRACT

A method of controlling a rotary electric machine, which is configured to supply an electric control amount to a power conversion unit, which is configured to convert a DC voltage from a power source into a drive current to the rotary electric machine in accordance with the electric control amount, the method including: using a conversion map, which is used to calculate the electric control amount based on a rotation speed of the rotary electric machine at a particular DC voltage of the rotary electric machine and a required command value; and calculating the electric control amount in accordance with a ratio between the particular DC voltage and the rotation speed of the rotary electric machine in determining the electric control amount in accordance with the conversion map.

4 Claims, 6 Drawing Sheets

(a)

(b)

METHOD OF CONTROLLING ROTARY ELECTRIC MACHINE

BACKGROUND OF THE INVENTION

1. Field of the Invention

The present invention relates to a method of controlling a rotary electric machine.

2. Description of the Related Art

In the related art, in a method of controlling a rotary electric machine, when a torque or output of the rotary electric machine is controlled, a current command value or voltage command value that is optimal for a torque or output required of the rotary electric machine is determined, and an amount of electricity to the rotary electric machine is controlled from a control device of the rotary electric machine based on the determined current command value or voltage command value. However, the optimal current command value or voltage command value is known to take a different value depending not only on the torque or output required of the rotary electric machine, but also on a DC voltage from a power source and a rotation speed of the rotary electric machine.

Meanwhile, there is also known a method of theoretically determining the current command value or voltage command value in consideration of the DC voltage and the rotation speed. However, the method is complicated, and is difficult to calculate while performing a feedback loop for control. Moreover, because of limitations on a memory and a calculation speed of a controller, it is difficult, for the purpose of calculating the required torque or output, to create maps indicating a current command value or voltage command value corresponding to a DC voltage or rotation speed for all conditions, to store those maps in the memory of the controller, and to sequentially perform calculations in the feedback loop for control to determine the current command value or voltage command value.

In view of the above-mentioned circumstances, in Japanese Patent Application Laid-open No. 2004-80896, a plurality of conversion maps indicating a torque or output required of the rotary electric machine are prepared to correspond to DC voltages or rotation speeds, and interpolation is performed therebetween. For example, the interpolation is performed between operating points of a graph of torque-rotation speed characteristics for a voltage Va and a graph of torque-rotation speed characteristics for a voltage Vb (Va>Vb) to determine an operating point for a voltage Vc (Va>Vc>Vb).

Also in Japanese Patent Application Laid-open No. 2015-201979, it is disclosed to determine, in graphs of torque-rotation speed characteristics, when there is an operating point for the voltage Va but there is no operating point for the voltage Vb in conversion maps, interpolation is performed between the operating point that is operable at the voltage Va and an operating point for the voltage Vb at the same rotation speed with a ratio between the voltages to determine an operating point for a voltage Vc, for example.

In Japanese Patent Application Laid-open No. 2004-80896 described above, in performing the interpolation between the voltages, there is no value to be interpolated near a constant power line, where there is no change in value, or in other such regions. Therefore, when there is a need to set a command value near the constant power line, it is impossible to perform the calculation. Moreover, in order to perform correction near the above-mentioned constant power line accurately, a large number of torque-current command maps are required.

Moreover, in Japanese Patent Application Laid-open No. 2015-201979 described above, when the graphs of torque-rotation speed characteristics are used, the torque is reduced to keep the same rotation speed, and hence torque accuracy is reduced. Moreover, in order not to reduce the torque accuracy, a large number of torque-current command maps are required.

SUMMARY OF THE INVENTION

The present invention has been made to solve the above-mentioned problems, and therefore has an object to obtain a method of controlling a rotary electric machine, with which the rotary electric machine may be controlled accurately even near a constant power line without using a large number of maps.

According to one embodiment of the present invention, there is provided a method of controlling a rotary electric machine, which is configured to supply an electric control amount to a power conversion unit, which is configured to convert a DC voltage from a power source into a drive current to the rotary electric machine in accordance with the electric control amount, the method including: using a conversion map, which is used to calculate the electric control amount based on a rotation speed of the rotary electric machine at a particular DC voltage of the rotary electric machine and a required command value; and calculating the electric control amount in accordance with a ratio between the particular DC voltage and the rotation speed of the rotary electric machine in determining the electric control amount in accordance with the conversion map.

According to the present invention, it is possible to control the rotary electric machine accurately even near the constant power line without using a large number of maps.

DESCRIPTION OF THE EMBODIMENTS

Figure 2:
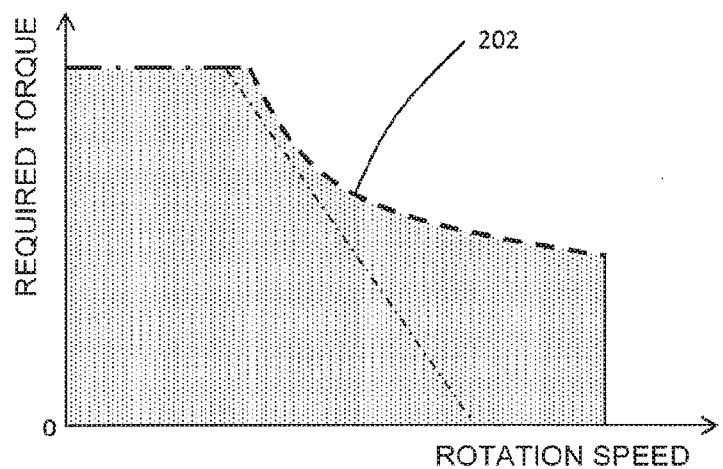
FIG. 2 is a graph for showing an example of a torque-current command map for a high voltage in order to describe the related art.
Figure 3:
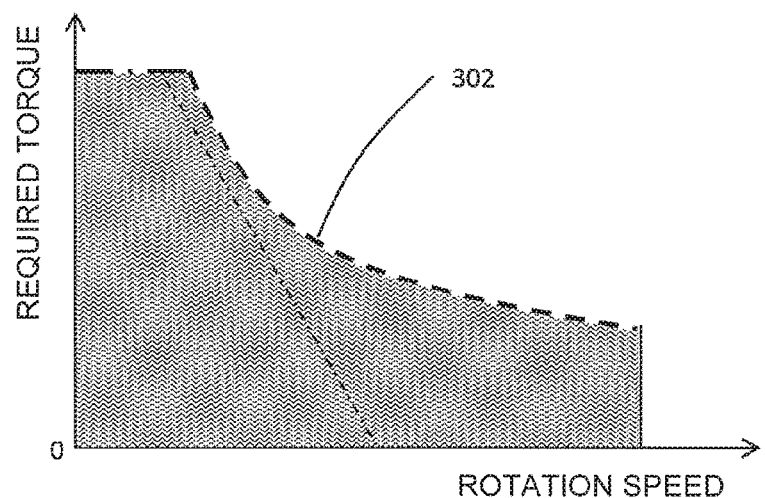
FIG. 3 is a graph for showing an example of a torque-current command map for a low voltage in order to describe the related art.
Figure 4:
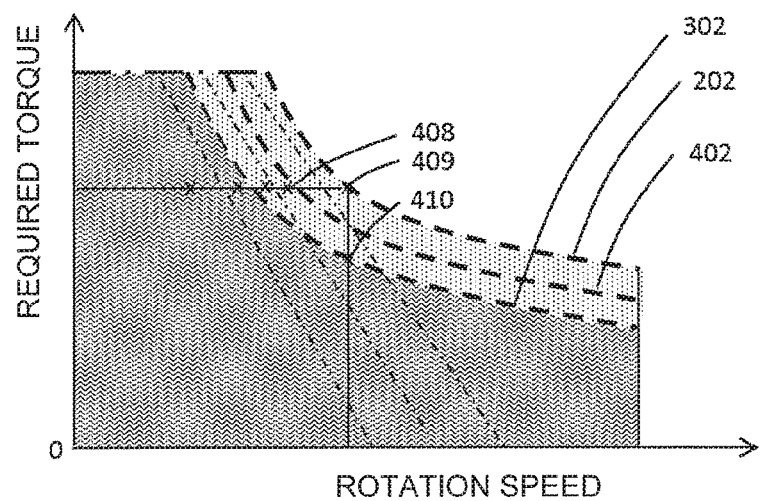
FIG. 4 is a graph for showing calculation of a current command value for an intermediate voltage in order to describe the related art.

First, a brief description is given of an example of an interpolation method in Japanese Patent Application Laid-open No. 2004-80896 described above. In FIG. 2, an example of a torque-current command map for showing a graph of torque-rotation speed characteristics for a high voltage Va is shown, and in FIG. 3, an example of a torque-current command map for a low voltage Vb (Va>Vb) is shown. In FIG. 4, a relationship between a torque and a rotation speed for an intermediate voltage Vc, which is between the high voltage Va and the low voltage Vb, is shown. In order to facilitate understanding of a relationship among FIG. 2, FIG. 3, and FIG. 4, maximum power lines 202, 302, and 402 are shown in the respective figures. In the case of FIG. 4, when a d-axis component current Id and a q-axis component current Iq of an operating point 408 are to be determined, interpolation is performed between operating points in the graphs of FIG. 2 and FIG. 3 to determine the operating point.

Also in Japanese Patent Application Laid-open No. 2015-201979 described above, there is disclosed an interpolation method in a case where there is an operating point for the high voltage Va but there is no operating point for the low voltage Vb in the conversion maps. For example, interpolation is performed between an operating point 409 that is operable at the high voltage Va and an operating point 410 for the low voltage Vb at the same rotation speed with a ratio between the voltages.

However, in Japanese Patent Application Laid-open No. 2004-80896 described above, when there has been a need to set a command value near the constant power line, it has been impossible to perform calculation. Therefore, in order to perform correction near the constant power line accurately, a large number of torque-current command maps have been required.

Moreover, in Japanese Patent Application Laid-open No. 2015-201979 described above, the torque has been reduced to keep the same rotation speed, and hence torque accuracy has been reduced. Moreover, in order not to reduce the torque accuracy, a large number of torque-current command maps have been required.

A method of controlling a rotary electric machine according to the present invention is described below with reference to the drawings. The same or corresponding elements are denoted by the same or corresponding reference symbols and a redundant description is omitted.

First Embodiment

Figure 1:
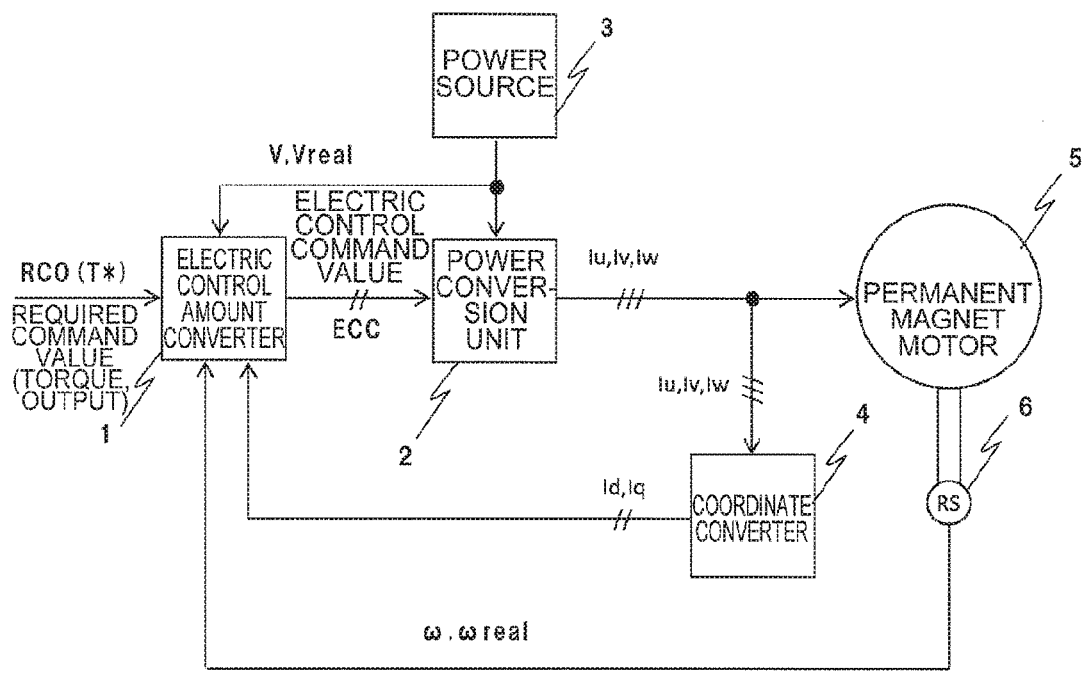
FIG. 1 is a functional block diagram for illustrating a schematic configuration of a control system of a rotary electric machine, to which a method of controlling a rotary electric machine according to one embodiment of the present invention is applied.

FIG. 1 is a functional block diagram for illustrating a schematic configuration of a control system of a rotary electric machine, to which a method of controlling a rotary electric machine according to one embodiment of the present invention is applied.

In FIG. 1, a power source 3, which is a DC power source, is configured to supply electric power to a power conversion unit 2.

The power conversion unit 2, which is formed of an inverter or the like, is configured to convert, in accordance with an electric control command value ECC indicating an electric control amount from an electric control amount converter 1, a DC voltage V from the power source 3 into phase currents Iu, Iv, and Iw of a U phase, a V phase, and a W phase, respectively in a case of a three-phase rotary electric machine, for example.

A coordinate converter 4 is configured to convert the phase currents Iu, Iv, and Iw into a d-axis component current Id and a q-axis component current Iq.

A rotary electric machine 5, which is formed of a permanent magnet motor, for example, is driven in accordance with the phase currents Iu, Iv, and Iw from the power conversion unit 2.

A rotation sensor (RS) 6, which is formed of a tachometer or the like, is configured to detect a real rotation speed ω real of the rotary electric machine 5.

The electric control amount converter 1 is configured to transmit the electric control command value ECC indicating the electric control amount to the power conversion unit 2 in accordance with a required command value RCO, which is a torque or output of the rotary electric machine, from an upper level of the control system, a real DC voltage Vreal of the power source 3, the d-axis component current Id and the q-axis component current Iq from the coordinate converter 4, and the real rotation speed ω real of the rotary electric machine 5 from the rotation sensor (RS) 6.

Figure 11:
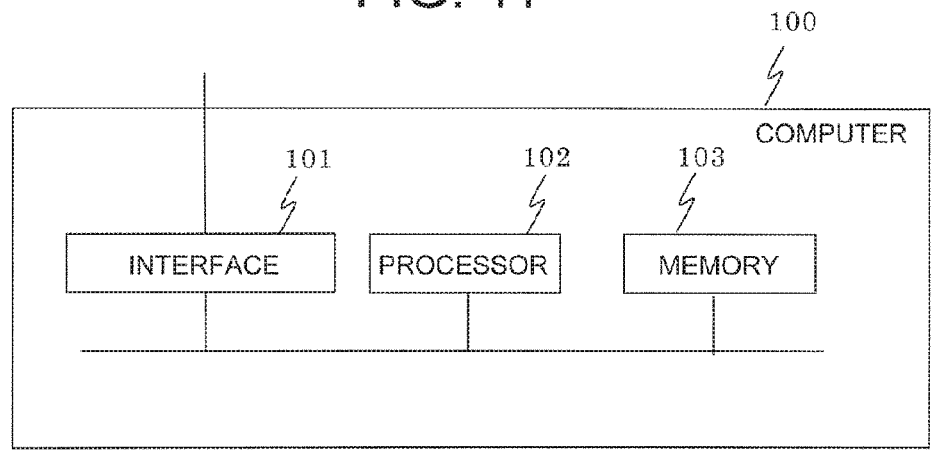
FIG. 11 is a schematic configuration diagram of a case where the method of controlling a rotary electric machine according to one embodiment of the present invention is executed by a computer.

Moreover, the electric control amount converter 1 and the coordinate converter 4 may be formed of a computer schematically illustrated in FIG. 11, for example. In a computer 100, input and output to and from outside the computer 100 are performed through an interface 101. In a memory 103, which forms a storage unit, programs for performing various functions, and conversion maps, formulae, and data required for processing are stored. A processor 102 is configured to perform arithmetic processing on signals, which are input through the interface 101, in accordance with the various programs, conversion maps, formulae, and data stored in the memory 103, and to output processing results through the interface 101.

In general, a rotation speed ω of a motor, which is the rotary electric machine 5, is changed with time, and a DC voltage V applied from the power source 3 to the power conversion unit 2, which is formed of the inverter or the like, is also changed. Moreover, it is conceivable that a torque or output, which is the required command value RCO to the rotary electric machine 5, may also be changed based on a command from the upper level of control.

As described above, the DC voltage V, the rotation speed ω, and the required command value RCO are changed sequentially. Therefore, appropriately determining the electric control command value ECC corresponding to the DC voltage V, the rotation speed ω, and the required command value RCO at the time leads to increased driving accuracy and efficiency of the rotary electric machine 5.

The power conversion unit 2 is configured to operate as follows when the electric current is controlled by the power conversion unit 2 in accordance with the electric control command value ECC. The power conversion unit 2 converts the DC voltage V into an AC voltage by pulse-width modulation (PWM), pulse-amplitude modulation (PAM), or the like. Then, the power conversion unit 2 controls the electric current by converting, when the electric control command value ECC is a current command value, the current command value into a voltage command value which is required in the power conversion unit 2, for example, or controls the electric current based on the voltage command value when the electric control command value ECC is the voltage command value. Moreover, a constant required for feedback in a proportional-integral-differential (PID) controller is also used.

Therefore, in order to describe how the present invention is applied when determining an appropriate electric control command value ECC, a case where a required command value RCO is a torque T is described below to facilitate understanding of the electric control amount converter 1 according to Example of the present invention, which is illustrated in FIG. 1. When the required command value RCO is an output ONT, the output ONT may be regarded as being equivalent to a value obtained by multiplying the torque T by the rotation speed ω.

A method of determining the current command value depending on the required torque is described. Depending on characteristics of the motor, which is the rotary electric machine 5, d-axis component inductance Ld,
    q-axis component inductance Lq,
    effective value φa of armature flux linkage of permanent magnets, and
    number Pn of pole pairs are different, and the current command value depending on the required torque is different.

A torque T is determined by the following expression:

$$T = Pn\{\varphi a \cdot Iq + (Ld - Lq) Id \cdot Iq\} \quad (1).$$

In the expression,
    Id represents the d-axis component current,
    Iq represents the q-axis component current,
    φa represents a constant value, which is a fixed value determined by the permanent magnets and their arrangement, for example, and
    Pn represents a fixed value determined by a design using the magnets.

Moreover, Ld and Lq are different depending on values of Id and Iq. Therefore, Ld and Lq are determined by simulating a magnet arrangement and the like and determining magnetic analysis using a finite element method (FEM) as maps by a simulation or experiment. For example, in order to determine Ld and Lq by experiment, the motor is actually caused to rotate and a d-axis voltage Vd and a q-axis voltage Vq, which respectively correspond to Id and Iq, are measured.

From the voltage equation, the following expressions are established:

$$Vd = Ra \cdot Id - \omega \cdot Lq \cdot Iq; \text{ and}$$

$$Vq = Ra \cdot Iq + \omega \cdot Ld \cdot Id + \omega \cdot \varphi a \quad (2).$$

Therefore, Ld and Lq, which respectively correspond to Id and Iq, may be determined based on a separately determined rotation speed ω and a resistance value Ra of the rotary electric machine 5.

Figure 5:
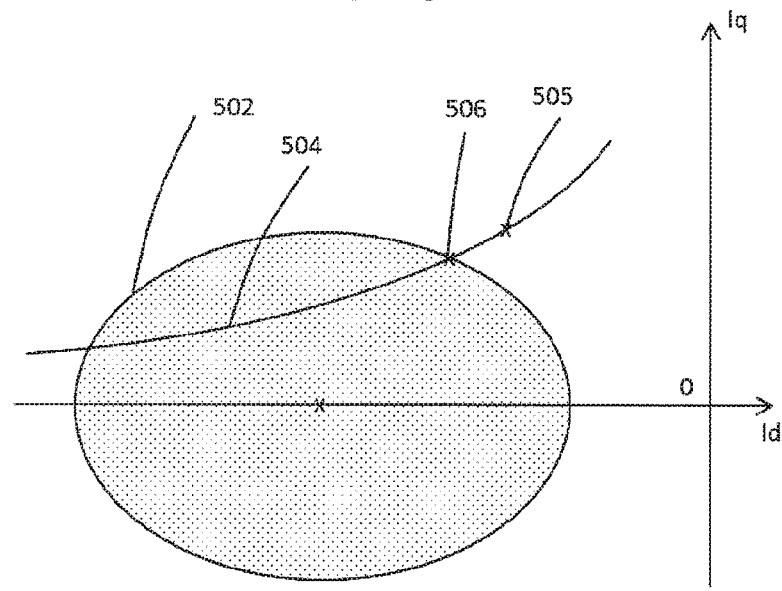
FIG. 5 is a graph for showing an example of a current vector locus for a low voltage in order to give a description on torque calculation in the control of a rotary electric machine according to the present invention.
Figure 6:
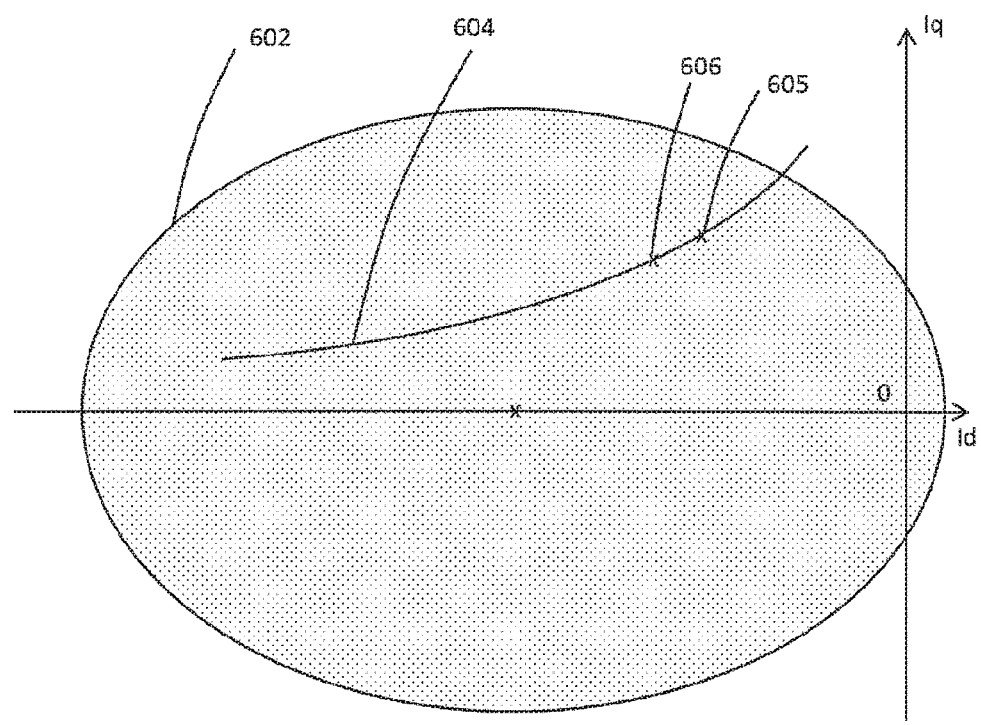
FIG. 6 is a graph for showing an example of a current vector locus for a high voltage in order to give a description on the torque calculation in the control of a rotary electric machine according to the present invention.

Based on the d-axis component inductance Ld and the q-axis component inductance Lq and the expression (1), which have been described above, a torque T corresponding to the d-axis component current Id and the q-axis component current Iq may be calculated. Examples thereof are shown in FIG. 5 and FIG. 6. In FIG. 5, an example of a current vector locus for a low voltage is shown, and in FIG. 6, an example of a current vector locus for a high voltage is shown. In FIG. 5 and FIG. 6, the horizontal axis indicates the d-axis component current Id, and the vertical axis indicates the q-axis component current Iq. Then, when a torque T corresponding to the Id and Iq command values are calculated based on the expression (1), lines at the same torque T may be drawn, and a constant torque line 504, 604 is drawn as an example. For the following description, on the current vector locus drawn with Id and Iq, a constant induced voltage ellipse 502, 602 is drawn. An "induced voltage" refers to a voltage generated when a flux density of a coil is changed with time because magnetic fluxes generated by the magnets rotate with respect to the coil when the motor is rotated. The constant induced voltage ellipse 502, 602 indicates a limit over which, with the generation of the induced voltage, an expected current is not allowed to flow against the induced voltage even when a voltage is applied between lines of the motor. Specifically, this means that points at which the current is controllable with the control device are located only within the constant induced voltage ellipse 502, 602 drawn on the current vector locus drawn in each of FIG. 5 and FIG. 6.

Now, the constant induced voltage ellipse is expressed as follows:

$$(Ld \cdot Id + \varphi a)^2 + (Lq \cdot Iq)^2 = (V/\omega)^2 \quad (3).$$

Based on the above expression, a size is changed in proportion to the DC voltage V/rotation speed ω.

Moreover, when the constant induced voltage ellipse is ignored, a point with the minimum current is 505, 506. However, when the constant induced voltage ellipse is considered, in the case of FIG. 5, the point 505 cannot be an operating point, and hence the constant torque curve is followed to shift an optimal operating point to the point 506. Meanwhile, in the case of FIG. 6, the optimal operating point 605 at which the motor operates under the minimum current condition is located within the constant induced voltage ellipse, and hence there is no need to set the point 606 as the optimal operating point. The case where the operating point under the minimum current condition is located within the constant induced voltage ellipse as in FIG. 6 is referred to as a "direct region", and the case where the operating point is not under the minimum current condition as in FIG. 5 is referred to as a "weakening region".

When the DC voltage V is changed, the size of the constant induced voltage ellipse described above is changed. Therefore, the direct region and the weakening region of the current command maps in FIG. 2 and FIG. 3 are changed, and the line is changed at a ratio between the DC voltage V and the rotation speed ω.

Figure 7:
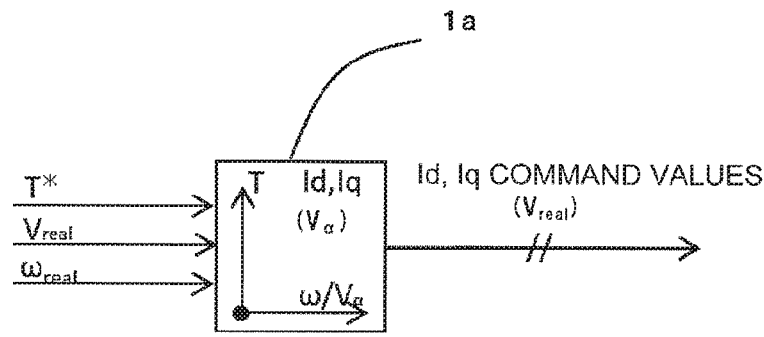
FIG. 7 is a block diagram of an example of an electric control amount converter when using a conversion map for a particular voltage in the method of controlling a rotary electric machine according to one embodiment of the present invention.

FIG. 7 is a block diagram of an example of the electric control amount converter 1 when using a conversion map for a particular DC voltage (Vα) in the method of controlling a rotary electric machine according to one embodiment of the present invention. An electric control amount converter 1a, which is illustrated as a conversion block in FIG. 7, is configured to use a conversion map stored in the memory 103, and the conversion map is a conversion map with the horizontal axis indicating the rotation speed ω and the vertical axis indicating the required torque (T) for the particular DC voltage Vα.

As a method of creating a conversion map for a particular voltage, a possible torque capable of operating with the minimum current may be determined by mapping based on the expressions (1) and (3), or by actually operating the rotary electric machine. Moreover, the rotation speed ω on the horizontal axis is normalized with the particular DC voltage Vα, but the rotation speed ω may be divided by the particular DC voltage Vα in the course of the calculation without being normalized.

In FIG. 7, the electric control amount converter 1a is configured to receive, as input, a torque T* as the required command value RCO, the real DC voltage Vreal from the power source 3, and the real rotation speed ω real of the rotary electric machine 5 from the rotation sensor 6, and to output, as the electric control command value ECC indicating the electric control amount, command values of the d-axis component current and the q-axis component current at the real DC voltage Vreal.

Figure 8A:
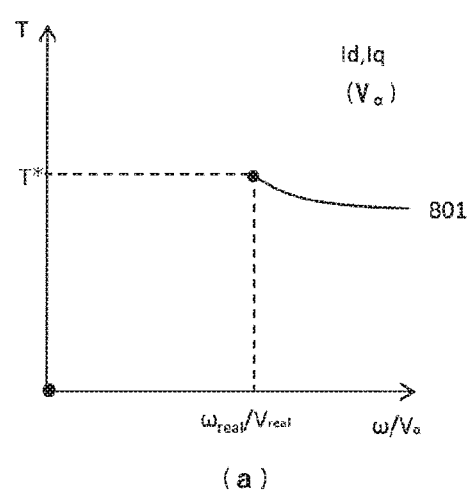
FIG. 8A and FIG. 8B are graphs for showing a method of calculating an electric control command value in the control of a rotary electric machine according to one embodiment of the present invention.
Figure 8B:
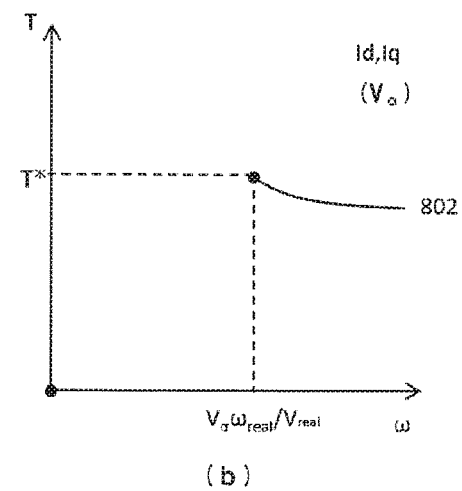

FIG. 8A and FIG. 8B are graphs for showing a method of calculating an electric control command value in the method of controlling a rotary electric machine according to one embodiment of the present invention.

FIG. 8A is a normalized graph obtained by dividing the rotation speed ω by the particular DC voltage Vα. This case is a method of determining, as indicated by a point 801, an electric control command value (electric control amount) ECC from the original map, the electric control command value ECC being the same value as a value obtained by dividing the real rotation speed ω real of the rotary electric machine by the real DC voltage Vreal of the rotary electric machine as expressed by ω/Vα.

In FIG. 8B, there is shown a method of determining, as indicated by a point 802, an electric control command value ECC at which Vα·ω real/Vreal takes the same value as ω, from the original map with use of the horizontal line indicating the rotation speed ω, the real DC voltage Vreal of the rotary electric machine, the real rotation speed ω real, and the particular DC voltage Vα, which is used when the conversion map is created.

As described above, the required torque T used on the vertical axis may be an output obtained by multiplying the required torque T by the rotation speed ω. Moreover, the current command values Id and Iq are calculated in this example, but Id and Iq may be converted into voltage command values Vd and Vq using the expressions (2).

Figure 9:
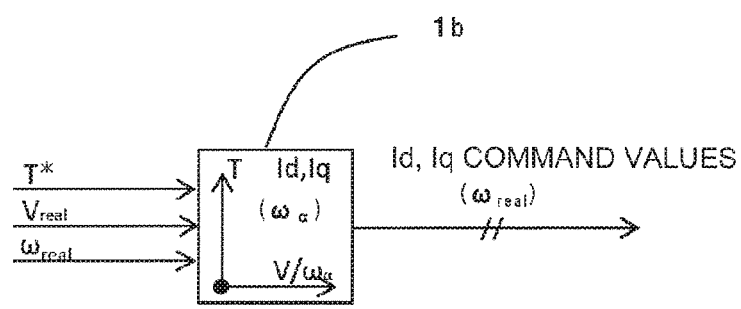
FIG. 9 is a block diagram of an example of an electric control amount converter when using a conversion map for a particular rotation speed in the method of controlling a rotary electric machine according to one embodiment of the present invention.

Moreover, a relationship obtained by interchanging the DC voltage V and the rotation speed ω also holds as in a conversion block in FIG. 9. FIG. 9 is a block diagram of an example of the electric control amount converter 1 when using a conversion map for a particular rotation speed (ω α) in the method of controlling a rotary electric machine according to one embodiment of the present invention. An electric control amount converter 1b, which is illustrated as the conversion block in FIG. 9, is configured to receive, as input, the torque T* as the required command value RCO, the real DC voltage Vreal from the power source 3, and the real rotation speed ω real of the rotary electric machine 5 from the rotation sensor 6, and to output, as the electric control command value ECC indicating the electric control amount, command values of the d-axis and q-axis component currents at the real rotation speed ω real.

The above description has been given of cases where it is assumed that the resistance value Ra of the rotary electric machine is very small and hence is negligible. However, when the electric control command value ECC, which is the electric control amount, is to be improved in accuracy, the resistance value Ra of the rotary electric machine needs to be considered. In order to examine how the resistance value Ra of the rotary electric machine affects the voltage, a voltage utilization rate m of a DC voltage Vdc corresponding to the DC voltage V is expressed as follows.

$$m = \sqrt{2}\frac{V_{rms}}{V_{dc}} = \sqrt{2}\sqrt{\left(\frac{Ra}{V_{dc}}I_d - \frac{\omega}{V_{dc}}L_q I_q\right)^2 + \left(\frac{Ra}{V_{dc}}I_q + \frac{\omega}{V_{dc}}(L_d I_d + \Phi_a)\right)^2} \quad (4)$$

$$V_{rms} = \sqrt{V_d^2 + V_q^2}$$

In the expressions (4), the above-mentioned ω/Vdc is constant, and hence Ra affects the currents Id and Iq as a reciprocal of Vdc.

As described above, in consideration of the resistance value Ra of the rotary electric machine, a plurality of conversion maps considering resistance values Ra at different DC voltages may be prepared.

Moreover, as described above, Vdc affects the currents Id and Iq as the reciprocal, and hence the current command may be determined by performing interpolation between reciprocals of DC voltages of the current command.

Figure 10:
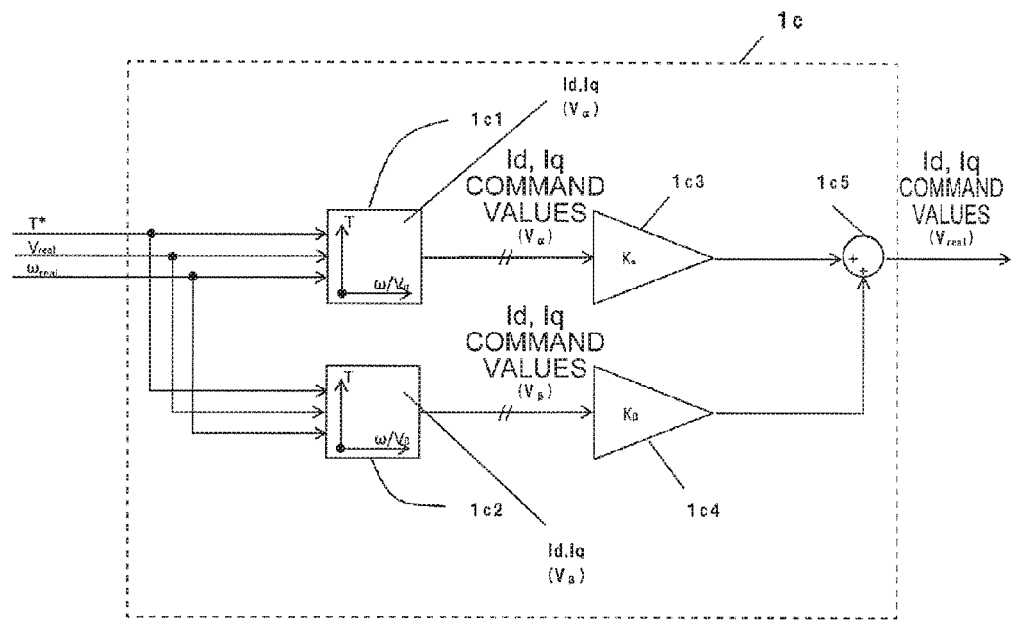
FIG. 10 is a block diagram of an example of an electric control amount converter when using conversion maps for a plurality of particular DC voltages in the method of controlling a rotary electric machine according to one embodiment of the present invention.

Specific Example is illustrated in FIG. 10. FIG. 10 is a block diagram of an example of the electric control amount converter 1 when using conversion maps for a plurality of particular DC voltages in the method of controlling a rotary electric machine according to one embodiment of the present invention. An electric control amount converter 1c illustrated in FIG. 10 is configured to use two conversion maps, which are illustrated as two conversion blocks 1c1 and 1c2, and obtained by normalizing the rotation speed ω with the particular DC voltages V=Vα and Vβ for two particular DC voltages. Calculation of a gain Kα and a gain Kβ in amplification units 1c3 and 1c4 is described below.

The interpolation is performed between the reciprocals of the voltages, and hence Kα and Kβ are expressed as follows:

$$K\alpha = (1/V\text{real} - 1/V\beta)/(1/V\alpha - 1/V\beta); \text{ and}$$

$$K\beta = 1 - (1/V\text{real} - 1/V\beta)/(1/V\alpha - 1/V\beta) \quad (5).$$

In the expression, Vreal represents the real DC voltage of the rotary electric machine, and Vα and Vβ represent particular DC voltages when the DC voltage V=Vα and Vβ, respectively. Moreover, the conversion maps corresponding to the particular DC voltages Vα and Vβ are used in the conversion blocks 1c1 and 1c2, respectively.

Moreover, in order to simplify the expressions (5), when it is assumed that Vβ is infinite, that is, the resistance value of the rotary electric machine is 0Ω, the expressions (5) may be rewritten as follows:

$$K\alpha = V\alpha/V\text{real}; \text{ and}$$

$$K\beta = 1 - V\alpha/V\text{real} \quad (6).$$

The expressions (5) may be used when detailed adaptation with each of the particular DC voltages Vα and Vβ is performed, and the expressions (6) may be used when the current command value has substantially been calculated with a theoretical expression and the like. In this way, Id and Iq current command values, which are optimal electric control command values ECC corresponding to the required torque T may be calculated.

Command values respectively output from the amplification units 1c3 and 1c4 are added together in an addition unit 1c5 to be output.

In FIG. 10, there is illustrated the example of the case where the conversion maps for the particular DC voltages in FIG. 7 are used. However, even when the conversion map for the particular rotation speed in FIG. 9 is used, a plurality of the conversion maps may be used to form an electric control amount converter as illustrated in FIG. 12.

Figure 12:
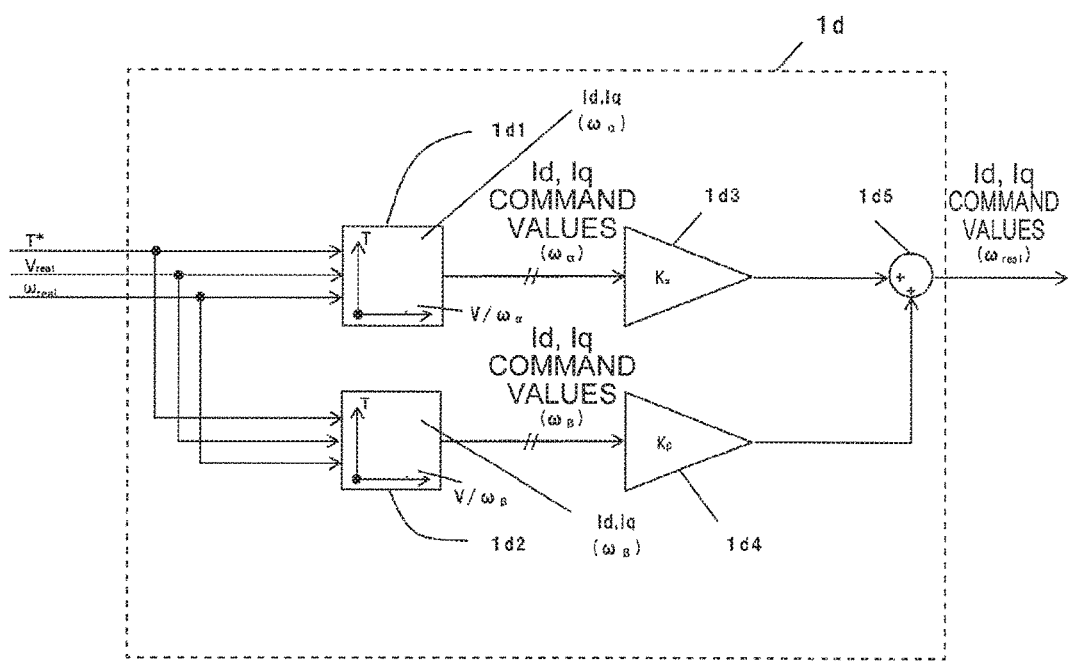
FIG. 12 is a block diagram of an example of an electric control amount converter when using conversion maps for a plurality of particular rotation speeds in the method of controlling a rotary electric machine according to one embodiment of the present invention.

Specific Example is illustrated in FIG. 12. FIG. 12 is a block diagram of an example of the electric control amount converter 1 when using conversion maps for a plurality of particular rotation speeds in the method of controlling a rotary electric machine according to one embodiment of the present invention. An electric control amount converter 1d illustrated in FIG. 12 is configured to use two conversion maps, which are illustrated as two conversion blocks 1d1 and 1d2, and obtained by normalizing the DC voltage V with the particular rotation speeds ω = ωα and ωβ for two particular rotation speeds. Calculation of a gain Kα and a gain Kβ in amplification units 1d3 and 1d4 is described below.

Based on the expression (3), the rotation speed ω is a reciprocal of the DC voltage V. Therefore, as opposed to Example in FIG. 10, there is no need to perform the interpolation between the reciprocals, and hence Kα and Kβ are expressed as follows:

$$K\alpha = (\omega_{real} - \omega\beta)/(\omega\alpha - \omega\beta); \text{ and}$$

$$K\beta = (\omega\alpha - \omega_{real})/(\omega\alpha - \omega\beta) \quad (7).$$

In the expression, ω real represents the real rotation speed of the rotary electric machine, and ωα and ωβ represent particular rotation speeds when the rotation speed ω = ωα and ωβ, respectively. Moreover, the conversion maps corresponding to the particular rotation speeds ωα and ωβ are used in the conversion blocks 1d1 and 1d2, respectively.

Command values respectively output from the amplification units 1d3 and 1d4 are added together in an addition unit 1d5 to be output.

What is claimed is:

1. A method of controlling a rotary electric machine, which is configured to supply an electric control amount to a power conversion unit, which is configured to convert a DC voltage from a power source into a drive current to the rotary electric machine in accordance with the electric control amount, the method comprising:
   using a plurality of conversion maps, which are used to calculate the electric control amount based on a rotation speed of the rotary electric machine at each different particular DC voltages of the rotary electric machine and a required command value; and
   calculating the electric control amount in accordance with a ratio between the particular DC voltages and the rotation speed of the rotary electric machine in determining the electric control amount in accordance with the plurality of conversion maps, respectively,
   wherein the required command value comprises one of a torque of the rotary electric machine and an output of the rotary electric machine, and the electric control amount comprises one of a current command value and a voltage command value, and
   wherein one of the plurality of conversion maps comprises a conversion map that is determined assuming that a resistance value of the rotary electric machine is 0Ω.

2. A method of controlling a rotary electric machine, which is configured to supply an electric control amount to a power conversion unit, which is configured to convert a DC voltage from a power source into a drive current to the rotary electric machine in accordance with the electric control amount, the method comprising:
   using a conversion map, comprising a plurality of conversion maps, which is used to calculate the electric control amount based on the DC voltage at a particular rotation speed of the rotary electric machine and a required command value; and
   calculating the electric control amount in accordance with a ratio between the DC voltage and the particular rotation speed of the rotary electric machine in determining the electric control amount in accordance with the conversion map; and
   performing interpolation using a reciprocal of the DC voltage in determining the electric control amount in accordance with the plurality of conversion maps.

3. The method of controlling a rotary electric machine according to claim 2, wherein the required command value comprises one of a torque of the rotary electric machine and an output of the rotary electric machine, and the electric control amount comprises one of a current command value and a voltage command value.

4. The method of controlling a rotary electric machine according to claim 3, wherein the using of the conversion map comprises using a plurality of conversion maps, which are used to calculate the electric control amount based on the DC voltage at each of different particular rotation speeds of the rotary electric machine and the required command value.

* * * * *